United States Patent [19]

Neff et al.

[11] 4,160,811

[45] Jul. 10, 1979

[54] PRODUCTION OF TETRAFLUORAMMONIUM BIFLUORIDE AND TETRAFLUORAMMONIUM TETRAFLUOROBORATE

[75] Inventors: Joseph A. Neff, San Clemente; William D. English, Orange, both of Calif.

[73] Assignee: TRW Inc., Redondo Beach, Calif.

[21] Appl. No.: 879,634

[22] Filed: Feb. 21, 1978

[51] Int. Cl.$^2$ .................... C01B 35/06; C01C 1/16
[52] U.S. Cl. .................... 423/276; 423/468; 423/470
[58] Field of Search ............ 423/276, 470, 464

[56] References Cited

PUBLICATIONS

Christe et al., "Annual Report Inorg. Halogen Oxidizer Research", R 9881, Off. Nav. Research, 4-1976, pp. 1-19 & A6-A-35.

Christe et al., "Annual Report Inorg. Halogen Oxidizer Res.", R 9662, Off. Nav. Res. 5-1975, Appendix B.

*Primary Examiner*—G. O. Peters
*Attorney, Agent, or Firm*—Christie, Parker & Hale

[57] ABSTRACT

The compound $NF_4MF_6$ where M is a Group V metalloid is reacted with a fluoride of sodium to yield tetrafluorammonium bifluoride in solution with hydrogen fluoride and a precipitate of the formula $NaMF_6$. The preferred metaloid is antimony. The formed tetrafluorammonium bifluoride may be converted to $NF_4BF_4$ by reaction with $BF_3$.

16 Claims, 1 Drawing Figure

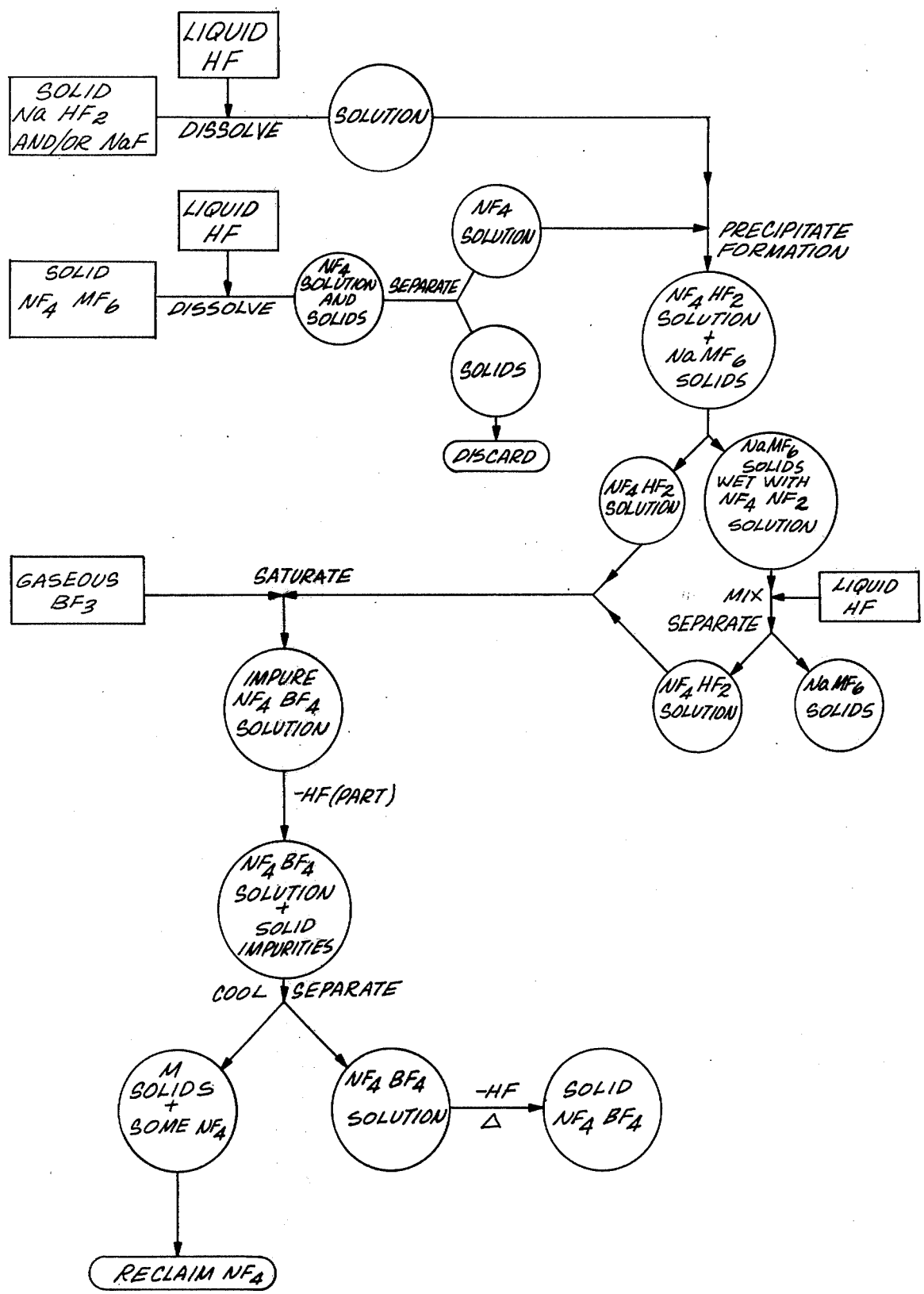

PRODUCTION OF TETRAFLUORAMMONIUM BIFLUORIDE AND TETRAFLUORAMMONIUM TETRAFLUOROBORATE

BACKGROUND OF THE INVENTION

Tetrafluorammonium tetrafluoroborate ($NF_4BF_4$) is used as a common ingredient in formulations for oxidizer source solid gas generators which find particular utility in combustion driven chemical lasers.

It has been demonstrated that tetrafluorammonium tetrafluoroborate may be prepared by metathesis of $NF_4SbF_6$ with CsF or AgF in anhydrous hydrogen fluoride to yield $CsSbF_6$ or $AgSbF_6$ as a precipitate and tetrafluorammonium bifluoride which is in turn reacted with boron fluoride to yield tetrafluorammonium tetrafluoroborate. The net reactions for cesium fluoride, for instance, may be written as $$NF_4SbF_6 + CsF \xrightarrow{HF} CsSbF_6 \downarrow + NF_4HF_2$$

Removal of the solid precipitate and treatment of the liquid phase which $BF_3$ forms the $BF_4$ salt by the reaction $$NF_4HF_2 + BF_3 \xrightarrow{HF} NF_4BF_4 + HF$$

Excess hydrogen fluoride is removed by evaporation.

Subject to strict safety precautions, $NF_4AsF_6$ may also be reacted with RbF to yield $RbAsF_6$ as the precipitate as a predicate to forming $NF_4BF_4$ from $NF_4HF_2$.

The main deficiency in the procedure is the cost of the added metal fluoride. The present cost of cesium fluoride is about $15,100 per pound mole and the cost of silver fluoride $15,500 per pound mole.

A need exists to find a lower cost metal fluoride which enables the conduct of the metathesis reaction at an equal or greater degree of completion.

SUMMARY OF THE INVENTION

It has now been found that a fluoride of sodium, ie, sodium fluoride, sodium bifluoride or mixtures thereof, will react with a metalloid compound of the formula $NF_4MF_6$ wherein M is a Group V metalloid, preferably antimony, in anhydrous hydrogen fluoride in the absence of air and water to yield $NaMF_6$ as a precipitate and yield tetrafluorammonium bifluoride in solution with hydrogen fluoride. The tetrafluorammonium bifluoride serves as an intermediate for preparing other fluoride compounds such as tetrafluorammonium tetrafluoroborate.

The metathesis reaction occurs equally well over a temperature range from about $-50°$ C. to well above ambient, eg., $100°$ C. under a hydrogen fluoride atmosphere. Temperatures from $0°$ C. to ambient are preferred for economy and at temperatures of ambient or below some crystallization of $NaMF_6$ will occur. For removal of substantial quantities of $NaMF_6$ from solution, temperatures of about $-20°$ to about $-50°$ C. are resorted to depending upon the degree of purity of the tetrafluorammonium bifluoride desired. The preferred temperature is $-40°$ C.

Essential to the conduct of the metathesis reaction is the separate formation of the fluoride of sodium in solution with anhydrous hydrogen fluoride and the $NF_4MF_6$ in anhydrous hydrogen fluoride prior to their combination.

As the fluorides of sodium are available at a cost of about $50.00 per pound mole, a material savings in cost of forming tetrafluorammonium bifluoride is realized.

The formed tetrafluorammonium bifluoride may be utilized in the practice of this invention as intermediate in formation of tetrafluorammonium tetrafluoroborate by known procedures.

THE DRAWING

The attached Drawing schematically illustrates steps which may be carried out in the practice of the processes of this invention.

DETAILED DESCRIPTION

According to the present invention, there is provided a process for the preparation of tetrafluorammonium bifluoride ($NH_4HF_2$) and, if desired, its conversion to tetrafluorammonium tetrafluoroborate ($NF_4BF_4$) by a metathesis process.

The reactants initially used are a compound of the formula $NF_4MF_6$ wherein M is a metalloid of Group V of the Periodic Table; M is preferably antimony. The key to economic metathesis is the use of a fluoride of sodium, namely, sodium fluoride, sodium bifluoride ($NaHF_2$) or mixtures thereof. As compared to cesium fluoride or silver fluoride for the exchange reactant for the heavier metals, the cost of the metathesis is substantially reduced.

With reference to the Drawing, the process comprises first forming a solution of a fluoride of sodium, namely, sodium fluoride, sodium bifluoride or mixtures thereof, in anhydrous liquid hydrogen fluoride in the absence of moisture and carbon dioxide. Formation of the solution occurs in a vessel wherein the liquid hydrogen fluoride is maintained in a liquid state by virtue of its own pressure. Temperatures of solution are not narrowly critical and typically temperatures from $+50°$ C. to $100°$ C. Temperatures from about $0°$ C. to ambient are preferred since little advantage is to be gained by forming the solutions at temperatures about ambient and maintaining lower temperatures also constitutes an energy cost.

Separately, there is formed a solution of the compound $NF_4MF_6$ in anhydrous liquid hydrogen fluoride, again, in the anhydrous state. Each solution in this and other stages of the process is desirably maintained under atmosphere of hydrogen fluoride which by its own pressure maintains anhydrous hydrogen fluoride in the liquid state.

Any solids which fail to dissolve in the anhydrous liquid hydrogen fluoride are separated and discarded. This leaves a solution containing the metal to be metathesized. The two solutions are then combined. Upon mixing, the metathesis reactions:

$$NF_4MF_6 + NaF \xrightarrow{HF} NaMF_6 + NF_4HF_2,$$

and/or $$NF_4MF_6 + NaHF_2 \xrightarrow{HF} NaMF_6 + NF_4HF_2$$

almost instantaneously occur over the temperature range set forth above. The product of the metathesis reaction, $NaMF_6$, will, at ambient temperatures and below, be precipitated at least in part from the formed solution of $NF_4HF_2$ in hydrogen fluoride.

If higher temperatures are employed, the formed species may remain in solution or precipitate therefrom depending upon the concentrations of the reactants employed.

To maximize purity of the tetrafluorammonium bifluoride ($NF_4HF_2$), the solution is cooled to a temperature of $-20°$ to $-50°$ C. to cause precipitation of the formed $NaMF_6$. Temperatures below $-50°$ C. may be employed to the disadvantage of the solution becoming viscous and difficult to handle. At temperatures of above $-20°$ C. much of the formed $NaMF_6$ will remain in solution to the extent that the end product will be one of less than desired purity. The optimum temperature based on viscosity and purity considerations is about $-40°$ C.

After formation of the solids, the solution of tetrafluorammonium bifluoride in hydrogen fluoride separated from the solids which are still wet with the valuable tetrafluorammonium bifluoride. Although solids are discardable as a by-product of this juncture, they are advantageously processed for recovery of as much of the tetrafluorammonium bifluoride as possible. To this end, the solids wet with the tetrafluorammonium bifluoride in hydrogen fluoride may be broken and agitated to release as much of the bound liquor as possible and then liquid hydrogen fluoride added in one or more washes to remove tetrafluorammonium bifluoride from the solids. The wash solutions are added to the solution formed as a consequence of the metathesis reaction and serve as an intermediate for the preparation of other compounds.

One end is for the reaction with boron trifluoride ($BF_3$) to generate tetrafluorammonium tetrafluoroborate $NH_4BF_4$ which is an oxidant source for solid gas generator used in combustion driven chemical lasers as well as an oxidant for solid propellants. Chemical lasers are described in the article "Chemical Lasers," by George C. Pimentel, *Scientific American*, April, 1966, incorporated herein by reference.

To this end, the solution of tetrafluorammonium bifluoride in hydrogen fluoride is combined with $BF_3$ by sparging the solution with gaseous $BF_3$ in an excess amount where tetrafluorammonium tetrafluoroborate is formed by the reaction:

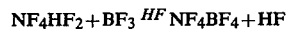

$$NF_4HF_2 + BF_3 \xrightarrow{HF} NF_4BF_4 + HF$$

This provides a solution of the tetrafluorammonium tetrafluoroborate with any impurities in anhydrous hydrogen fluoride.

The solution may be caused to evaporate in part by release of hydrogen fluoride to concentrate the solution and initiate the precipitation of solid impurities. The solution at this point is cooled, again from a temperature from $-20°$ to $-50°$ C. to cause precipitation of the impurities which include residual metalloid solids and some $NF_4$. The $NF_4$ may be recovered from the solids by the evaporation.

The residual solution of tetrafluorammonium tetrafluoroborate in hydrogen fluoride is then subjected to evaporation for removal of the hydrogen fluoride and the solid $NF_4BF_4$ heated to dryness. Heating may be accomplished up to the decomposition temperature of the tetrafluorammonium tetrafluoroborate, more typically, from a temperature of from about 50° to about 130° C.

While nowise limiting, the following examples illustrate in greater detail the practice of the instant invention.

EXAMPLE I—Preparation of $NF_4HF_2$

With cooling, there was dissolved 102.8 g of $NaHF_2$ in 807 g of anhydrous liquid hydrogen fluoride. This first solution was maintained at about 0° C. A second solution was formed with slight warming by addition of 485 g of a salt mix (90 mole % $NF_4SbF_6$, 10 mole % $SbF_5$) in 629 g of anhydrous fluoride. Twenty grams of residual dry solids were removed from the second solution. The second solution was added to the first solution with stirring over a 20 minute period while maintaining temperature at $0° \pm 5°$ C. The mixed solutions were agitated for 5 minutes while cooling to $-50° \pm 5°$ C. After 3 minutes setting time during which a precipitate was formed, the mother liquor ($NF_4HF_2$ in anhydrous $HF_2$) was removed. The precipitate was agitated three separate times to break dendritic structure and release additional mother liquor which was separated after each agitation step from the solids and until the volume of mother liquor released was less than 10 ml. The solids in crystalline form were respectively mixed with 56.53 g, then 51.13 g of anhydrous hydrogen fluoride to remove entrained $NF_4HF_2$. In each instance, after agitation and resettling of solids, the liquor separated from the solids was combined with the previously removed mother liquors. The total quantity of liquid collected was 1667 g. The solids having a dry weight of 281 g contained 0.6% by weight $NF_3$. Ten milliliters (14.6 g) of the liquid obtained was also evaporated to dryness. 1.87 g of solid was obtained. The solids contained 10% by weight $NF_3$.

EXAMPLE II—Preparation of $NF_4BF_4$

The residual liquid from Example I was stirred at $0° \pm 5°$ C. and sparged with $BF_3$ at an introduction pressure of 10 psig until a pressure of between 4 and 5 psig was obtained by the presence of excess $BF_3$. The total amount of $BF_3$ utilized was 120 g. The pressure was released to out gas excess $BF_3$ to leave a solution volume of 1148 ml. An aliquot of the liquid weighing 11.59 g was evaporated until the first appearance of solids as represented by a cloudy appearance. At this juncture 3.45 g of liquid remained. With further evaporation to 3.38 g, crystals appeared. At total evaporation of visible liquid, 2.97 of solids were obtained which were dried in vacuum at 50° C. to a dry weight of 1.98 g. The analysis of the solid disclosed $NF_3$ to a content of 24.2% by weight. The amount of liquid in the residual solution to be removed to reach the point of first crystallization was calculated. This was determined to be 1175 ml. The solution was evaporated to the calculated volume leaving 607 g of solution. The solution was cooled to $-30° \pm 5°$ C. and 590 ml of liquor decanted leaving solids which were dried to a weight of 47.16 g. Analysis revealed the solids to contain 4.99% by weight $NF_3$ and 39.1% by weight $BF_4$. The decanted liquid was evaporated to remove 282 g of liquid and to leave 264 g solids. Analysis of the solids revealed them to be 27.2% by weight $NF_3$ and 39.2% by weight $BF_4$. The amount of liquid hydrogen fluoride equal to 75% of that removed in the evaporation of the decanted liquid was calculated to be 210 g which at $-50° \pm 5°$ C. was mixed to the solids at $-50°$ C. with agitation. The crystals were allowed to settle, the liquor decanted and the solids dried. The amount of solids settled from the liquid as by-product was 64 g and analyzed to contain 22.7% $NF_3$ and 41.0% by weight $BF_4$. The decanted solution was evaporated to dryness and the solids dried at 50° C. and found to contain $NF_3$ in the amount of 22.2% by weight. The drying temperature was increased to 130°

C. A final solid weight of 188.7 g was obtained which analyzed to contain 33.4% by weight $NF_3$, 39.9% by weight $BF_4$, 0.596% by weight Na and 8.94% by weight Sb. The purity of $NF_4BF_4$ was 83% on a weight basis.

EXAMPLE III—Preparation $NF_4HF_2$

With cooling, there was dissolved 102.0 g of $NaHF_2$ in 834 g of anhydrous liquid hydrogen fluoride. This first solution was maintained at about 0° C. A second solution was formed with slight warming by addition of 491 g of a salt mix (90 mole % $NH_4SbF_6$, 10 mole % $SbF_5$) in 566 of anhydrous fluoride. Eight grams of residual dry solids were removed from the second solution. The second solution was added to the first solution with stirring. The mixed solutions were agitated with cooling to $-50° \pm 5°$ C. After a precipitate formation, the mother liquor ($NF_4HF_2$ in anhydrous $HF_2$) was removed. The precipitate was agitated three separate times to break dendritic structure and release additional mother liquor which was separated after each agitation step from the solids and until the volume of mother liquor released was less than 10 ml. The solids in crystalline form were in two washes, washed with a total of 74 grams of anhydrous hydrogen fluoride to remove entrained $NF_4HF_2$. In each instance, after agitation and resettling of solids, the liquor separated from the solids and combined with the previously removed mother liquors. The total quantity of liquid collected was 2061 g. The solids having a dry weight of 371 g contained 0.0 by weight $NF_3$.

EXAMPLE IV—Preparation of $NF_4BF_4$

The liquor from Example III was stirred at $0° \pm 5°$ C. and sparged with $BF_3$ at an initial pressure of 10 psig until a pressure of between 4 and 5 psig was obtained by the presence of excess $BF_3$. The total amount of $BF_3$ utilized was 122 g. The pressure was released out gas excess $BF_3$ to leave a solution mass of 2164 ml. The solution was evaporated to a calculated volume of 923 g. The solution was cooled to $-30° \pm 5°$ C. liquor decanted leaving solids which were dried to a weight of 57 g. Analysis revealed the solids to contain 5.76% by weight $NF_3$ and 44.0% by weight $BF_4$. The decanted liquid was evaporated to a final volume corresponding to the amount of anhydrous hydrogen fluoride added in Example I, then cooled to $-50°$ C. and the liquor decanted. The by-product solids (57 g) were dried at 50° C., analyzed and found to contain 21.3% by weight $NF_3$, 48.4% by weight $BF_4$, 0.511% by weight Na and 18.3% by weight Sb. The liquor was evaporated to dryness and the solids dried at 130° C. The solids weighing 210 g had the following analysis: 34.2% by weight $NF_3$, 41.5% by weight $BF_4$, 0.30% by weight Na and 9.35% by weight Sb. Purity of the $NF_4BF_4$ was 85% by weight mixed to the solids at $-50°$ C. with agitation. The crystals were allowed to settle, the liquor decanted and the solids dried. The amount of solids settled from the liquid as by-product was 64 g and analyzed to contain 22.7% $NF_3$ and 41.0% by weight $BF_4$. The decanted solution was evaporated to dryness and the solids dried at 50° C. and found to contain $NF_3$ in the amount of 22.2% by weight. The drying temperature was increased to 130° C. A final solid weight of 188.7 g was obtained which analyzed to contain 33.4% by weight $NF_3$, 39.9% by weight $BF_4$, 0.596% by weight Na and 8.94% by weight Sb. The purity of $NF_4BF_4$ was 83% by weight.

The apparatus used in the conduct of the above Examples was constructed from fluorocarbon plastics to allow visual inspection of the state of the system. Tubing was ¼ inch Teflon[TM]- FEP[(a)]. Tube fittings are made from Teflon [TM]-TFE[(b)] and Kel-F[TM]. Stock compression fittings were converted to flare type by machining a 45° cone on the end of the male part of the union and reversing the inner ferrule when assembling. Vessels are primarily Teflon—FEP[b]. Reactors were appropriate vessels made of FEP, ranging from 200 ml to 2000 ml.

*(a) Fluorinated Ethylene Propylene (b) Tetrafluoroethylene

All HF solutions which contain unneutralized $SbF_5$ attack Monel very rapidly—corrosion rates are many inches per year. This is true even for (90 mole % $NF_4SbF_6$, 10 mole % $SbF_5$) in which 90% of the $SbF_5$ is neutralized. However, it was demonstrated that complete neutralization of the $SbF_5$ prevents the attack. Addition of a quantity of $NaHF_2$ just equivalent to the free $SbF_5$ in the above compound, at a dilution great enough to prevent precipitation, gave a solution which did not attack Monel at all.

The basic analytical procedure consists of aqueous hydrolysis of a weighed specimen of the material in a closed system, then removal of the gaseous products and separation of other volatiles from $NF_3$, and weighing the $NF_3$. The aqueous phase is then analyzed for some or all of the various constituents, including antimony, sodium, copper, nickel, boron, fluoride and $BF_4$.

Determination of $BF_4$ was made using an Orion 93-05 tetrafluoroborate specific ion electrode and a 90-02-00 reference electrode with an expanded scale pH/millivolt meter, the system is calibrated with standard $NaBF_4$ and $H_3BO_3+HF$ as described in the manual (Orion Research Incorporated form 1M9305/576) for the electrodes, and a calibration curve drawn plotting the emf (millivolts) versus the log of the molar concentration (see FIG. 3). Using a plastic pipette, one each—1 ml and 5 ml aliquots of the hydrolysis solution are withdrawn, each diluted to 100 ml, and the emf developed by the solutions measured. Using the calibration curve, the $BF_4$ concentration in the solution is determined and then the concentration in the sample calculated.

Fluoride concentration in the sample (in solution) is determined according to EPA *Manual of Method for Chemical Analysis of Water and Waste* p. 65–67 with a specific ion electrode. A Corning 103 electrometer amplifier is used to measure the electrode potential developed between a Orion 94-09 Fluoride Ion Activity Electrode and a Orion 90-01 Reference electrode. This electrometer amplifier is connected to a Cimron 7200 A voltmeter for digital readout.

The electrode potentials of the samples are measured. A series of standards with concentrations in the vicinity of that of the samples is made. The concentrations of fluoride of the standards are plotted on the log axis versus the corresponding electrode potentials developed on the linear axis. The concentration of fluoride in the sample is then read from this calibration graph (a straight line).

This procedure is used to measure concentration of fluoride between 0.1 to 1000 mg/l. Dilutions are made if the concentrations of the samples exceed 1000 mg/l.

All other elements are analyzed by Atomic Absorption Spectroscopy. The samples (in solution) are aspirated into a flame which provide the energy to excite the elements. A hollow-cathode lamp which is specific to that element provides the energy to raise the atoms to their excited states. This hollow-cathode lamp emits a spectrum of wavelengths, one of which the element will absorb intensely. A monochromator tuned in at this resonant wavelength will allow the detection system to monitor the out-put of the hollow-cathode lamp at this wavelength only. The decrease in intensity is proportional to the concentration of the element in the solution. A Jarrell-Ash 810 Atomic Absorption Spectrophotometer was used for these analyses. This is a double-channel, double-beam instrument. Its possession of a double channel allows the analysis of an element with an absorbing wavelength in one channel while correcting for any background absorption and flame generated interferences with an non-absorbing wavelength with the other channel. Each channel is double-beam which can correct for any drift of the output of the hollow-cathode lamp.

The standard solutions employed are obtained commercially from Steri-Kern, Inc. in concentration of 1000 ppm. Dilutions of the standard are made to prepare standards in the sensitivity range specific to the response of each element. Dillutions of the samples are also made to bring the solution to the same range. A calibration curve with concentrations of the standards vs. the corresponding absorptions is made. The concentrations of the samples will be read off from this calibration curve. Table I is a list of the resonant wavelength, flame type used as well as the sensitivity range and accuracy of determination for each element.

When analyses of specimens from various steps in the procedure were conducted, problems were encountered in obtaining reproducible values for $F^-$ content for substances high in antimony. It appears that the replacement complexation reaction used to release the fluoride from the antimony is not always complete. It was demonstrated that antimony, even in large concentrations, does not interfere in the $BF_4$ specific ion determination, so this latter analysis was substituted for the simple fluoride determination.

Table I

| Parameters for Atomic Absorption Analysis for Specific Elements | | | | |
|---|---|---|---|---|
| Element | Resonant Wavelength | Flame-Type Oxidant/Fuel | Range | Accuracy |
| Antimony | 2176A | Air/Acetylene | 10–75 mg/l | ± 1 mg/l |
| Boron | 2497A | Nitrous Oxide/ Acetylene | 100–1000 mg/l | ± 10 mg/l |
| Sodium | 5890A | Air/Acetylene | 0.3–1 mg/l | ± 0.01 mg/l |
| Copper | 3247A | Air/Acetylene | 1–10 mg/l | ± 0.1 mg/l |
| Nickel | 2320A | Air/Acetylene | 2–20 mg/l | ± 0.1 mg/l |

Fluorine Yield Calculations

The figure of merit for a solid reactant fluorine source is the mass of usable oxidant fluorine formed per unit mass of reactant. This can be calculated by using the equation Fraction Usable $F =$ $$\frac{1.338 \times (\% \, w/w \, NF_3 \text{ released on hydrolysis})}{100 + 1.2 \times \frac{\% \, w/wB}{10.81} + \frac{\% \, w/wSb}{121.75} - \frac{\% \, w/wNa}{22.99}} \times \text{mol. wt. scav}$$

This equation assumes the use of a scavenger to absorb the $BF_3$ generated, with the scavenger present at 1.2 times the stoichiometric requirement. Typical scavengers are sodium fluoride (mol. wt.=41.99) and potassium fluoride (mol. wt.=58.10).

Thus for the product from Example II $$\text{Usable } F = \frac{1.338 \times 33.4}{100 + 1.2 \times \frac{4.96}{10.81} + \frac{8.94}{121.75} - \frac{0.6}{22.9} \times 58.1}$$

$$= 0.34$$

and for Example IV Usable $F = 0.332$

This equation is correct even when "polymer" and "complex" multinuclear anions are present.

The equation does not predict the purity of the gas product, only the yield of oxidizer species, so the calculations are not influenced by dissociation of $MBF_4$ to yield MF (s)+$BF_3$ (g). Because of this potential side reaction, the equation is not used to predict either the total mass of gas formed, or the mass of the clinker left after the generation reaction is complete.

Analytical Constitution

Because the reaction of interest in the product is the pyrolysis to $NF_3 + F_2$ by the general reaction:

$$NF_4XF_n \rightarrow NF_3 + F_2 + XF_{n-1}$$

it is the $NF_4$ content that is of specific interest in utilizing the product. Therefore, in practical terms, the "purity" can be defined as ration of the actual $NF_3$ content measured by hydrolysis, to the theoretical $NF_3$ content of pure $NF_4BF_4$.

When this definition is applied, the materials prepared have the following purities
Example II: 100×33.38/40.16=83.1% pure
Example IV: 100×34.2/40.16=85.2% pure The remaining species (B, Sb, Na, etc.) then define the amount of scavengers required.

What is claimed is:
1. A process for the production of tetrafluorammonium bifluoride which comprises, in the absence of carbon dioxide and water:
    (a) forming a solution of a fluoride of sodium selected from the group consisting of sodium fluoride, sodium bifluoride and mixtures thereof in anhydrous liquid hydrogen fluoride;
    (b) forming a solution of a first metalloid compound of the formula $NF_4MF_6$ wherein M is a Group V metalloid in anhydrous liquid hydrogen fluoride;
    (c) combining the solution of the fluoride of sodium in anhydrous liquid hydrogen fluoride and the solution of the first metalloid compound in anhydrous liquid hydrogen fluoride to form, by metathesis, a solution of tetrafluorammonium bifluoride in anhydrous liquid hydrogen fluoride and a second metal- loid compound of the formula NaMF$_6$ wherein M is a Group V metalloid;

(d) separating, by crystallization, the second metalloid compound from the solution of tetrafluorammonium bifluoride in anhydrous liquid hydrogen fluoride at a temperature of from about −20° to about −50° C.

2. A process as claimed in claim 1 in which M is antimony.

3. A process as claimed in claim 1 in which the solution of tetrafluorammonium bifluoride in anhydrous liquid hydrogen fluoride is formed by metathesis at a temperature from about −50° to about 100° C.

4. A process as claimed in claim 1 in which the solution of tetrafluorammonium bifluoride in anhydrous liquid hydrogen fluoride is formed by metathesis at a temperature from about 0° C. to ambient.

5. A process as claimed in claim 1 in which the second metalloid compound is recovered from the solution of tetrafluorammonium bifluoride at a temperature of about −40° C.

6. A process as claimed in claim 1 in which the crystallized second metalloid compound is removed from the solution of tetrafluorammonium bifluoride and washed with anhydrous liquid hydrogen fluoride to recover tetrafluorammonium bifluoride entrained by the crystals at a temperature from −20° to about −50° C.

7. A process for the production of tetrafluorammonium bifluoride which comprises, in the absence of carbon dioxide and water:

(a) forming a solution of a fluoride of sodium selected from the group consisting of sodium fluoride, sodium bifluoride and mixtures thereof in anhydrous liquid hydrogen fluoride;

(b) forming a solution of a first metalloid compound of the formula NF$_4$MF$_6$ wherein M is a Group V metalloid in anhydrous liquid hydrogen fluoride;

(c) combining the solution of the fluoride of sodium in anhydrous liquid hydrogen fluoride and the solution of the first metalloid compound in anhydrous liquid hydrogen fluoride to form, by metathesis, a solution of tetrafluorammonium bifluoride in anhydrous liquid hydrogen fluoride and a second metalloid compound of the formula NaMF$_6$ wherein M is a Group V metalloid;

(d) separating, by crystallization, the second metalloid compound from the solution of tetrafluorammonium bifluoride in anhydrous liquid hydrogen fluoride at a temperature of from about −20° to about −50° C.;

(e) separating the solution of tetrafluorammonium bifluoride in anhydrous liquid hydrogen fluoride from the crystallized second metalloid compound;

(f) adding boron trifluoride to the separated solution of tetrafluorammonium bifluoride in anhydrous liquid hydrogen fluoride to form tetrafluorammonium tetrafluoroborate in solution with hydrogen fluoride;

(g) recovering tetrafluorammonium tetrafluoroborate by evaporation of hydrogen fluoride.

8. A process as claimed in claim 7 in which the solution of tetrafluorammonium tetrafluoroborate is subjected to partial evaporation of hydrogen fluoride and cooling to form a precipitate of solid impurities and a residual solution of tetrafluorammonium tetrafluoroborate in anhydrous liquid hydrogen fluoride, and the residual solution is separated from the precipitate and subjected to evaporation of hydrogen fluoride to recover solid tetrafluorammonium tetrafluoroborate.

9. A process as claimed in claim 7 in which the tetrafluorammonium tetrafluoroborate is recovered by evaporation of hydrogen fluoride at a temperature from about 50° to about 130° C.

10. A process as claimed in claim 8 in which the tetrafluorammonium tetrafluoroborate is recovered from the residual solution by evaporation of hydrogen fluoride at a temperature from about 50° to about 130° C.

11. A process as claimed in claim 8 in which the solution of tetrafluorammonium tetrafluoroborate is subjected to cooling to a temperature of from −20° to −50° C. to separate the precipitate of solid impurities and leave the residual solution.

12. A process as claimed in claim 7 in which M is antimony.

13. A process as claimed in claim 7 in which the solution of tetrafluorammonium bifluoride in anhydrous liquid hydrogen fluoride is formed by metathesis at a temperature from about −50° to about 100° C.

14. A process as claimed in claim 7 in which the solution of tetrafluorammonium bifluoride in anhydrous liquid hydrogen fluoride is formed by metathesis at a temperature from about 0° C. to ambient.

15. A process as claimed in claim 7 in which the second metalloid compound is recovered from the solution of tetrafluorammonium bifluoride at a temperature of about −40° C.

16. A process as claimed in claim 7 in which the crystallized second metalloid compound is removed from the solution of tetrafluorammonium bifluoride and washed with liquid anhydrous hydrogen fluoride to recover tetrafluorammonium bifluoride entrained by the crystals at a temperature of from −20° to −50° C. and the recovered tetrafluorammonium bifluoride in anhydrous hydrogen fluoride is combined with a separated solution of tetrafluorammonium bifluoride in anhydrous hydrogen fluoride prior to addition of the boron trifluoride.

* * * * *